United States Patent [19]

Liang et al.

[11] Patent Number: 5,418,855

[45] Date of Patent: May 23, 1995

[54] AUTHENTICATION SYSTEM AND METHOD

[75] Inventors: Louis H. Liang, Los Altos, Calif.;
Daniel A. Marinello, Burlington, Ky.;
William J. Ryan, Underhill, Vt.;
Donald L. Wray, Sunrise, Fla.

[73] Assignee: Angstrom Technologies, Inc., Florence, Ky.

[21] Appl. No.: 127,250

[22] Filed: Sep. 27, 1993

[51] Int. Cl.$^6$ .............................................. H04L 9/00
[52] U.S. Cl. ......................................... 380/23; 380/54; 380/59
[58] Field of Search ........................... 380/54, 59, 23; 250/271, 556; 156/643; 235/491; 283/88, 91, 92; 106/21; 382/7; 378/44

[56] References Cited

U.S. PATENT DOCUMENTS

| | | | |
|---|---|---|---|
| 3,207,910 | 9/1965 | Hirshfeld et al. | 250/226 |
| 3,444,517 | 5/1969 | Rabinow | 340/146.3 |
| 3,477,156 | 11/1969 | Naito | 40/2.2 |
| 3,624,644 | 10/1971 | Higgins | 380/59 |
| 3,650,400 | 3/1972 | Warren et al. | 209/111.5 |
| 3,663,813 | 5/1972 | Shaw | 250/71 R |
| 3,666,946 | 5/1972 | Trimble | 250/71 R |
| 3,801,782 | 4/1974 | Dorion | 250/271 |
| 3,946,203 | 3/1976 | Hecht et al. | 235/61.11 E |
| 4,146,792 | 3/1979 | Stenzel et al. | 250/365 |
| 4,202,626 | 5/1980 | Mayer, Jr. et al. | 380/54 |
| 4,275,299 | 6/1981 | Favre | 250/271 |
| 4,538,290 | 8/1985 | Nakamura | 378/44 |
| 4,598,205 | 7/1986 | Kaule et al. | 250/458.1 |
| 4,642,526 | 2/1987 | Hopkins | 315/244 |
| 4,736,425 | 4/1988 | Jalon | 380/59 |
| 4,740,269 | 4/1988 | Berger et al. | 156/643 |
| 4,745,285 | 5/1988 | Recktenwald et al. | 250/458.1 |
| 4,756,557 | 7/1988 | Kaule et al. | 283/85 |
| 4,758,716 | 7/1988 | Mayer et al. | 235/470 |
| 4,833,311 | 5/1989 | Jalon | 235/491 |
| 4,891,505 | 1/1990 | Jalon | 235/491 |
| 4,908,516 | 5/1990 | West | 250/556 |
| 4,921,280 | 5/1990 | Jalon | 283/88 |
| 4,921,534 | 5/1990 | Jalon | 106/20 |
| 4,924,088 | 5/1990 | Carman et al. | 250/271 |
| 4,983,817 | 1/1991 | Dolash et al. | 235/462 |
| 5,005,873 | 4/1991 | West | 283/92 |
| 5,021,641 | 6/1991 | Swartz et al. | 235/467 |
| 5,030,833 | 7/1991 | Nozaka et al. | 250/461.1 |
| 5,063,297 | 11/1991 | Hardenbrook et al. | 250/458.1 |
| 5,161,829 | 11/1992 | Detrick et al. | 283/91 |
| 5,188,349 | 6/1992 | Jalon | 106/21 |
| 5,208,869 | 5/1993 | Holt | 382/7 |

*Primary Examiner*—Salvatore Cangialosi
*Attorney, Agent, or Firm*—Theodore R. Touw

[57] ABSTRACT

A system for authentication of articles uses a multiplicity of discriminating variables to characterize light detected from the articles after predetermined illumination. Articles are tested which have been marked with substances such as dye or ink that fluoresce in a region of the optical spectrum when illuminated with light in another region of the spectrum, such as the ultraviolet region. The authentication system illuminates the articles with light modulated at a frequency of more than about 50 kHz, and secondary fluorescent light returned from the articles is synchronously detected. A programmable microcomputer digitizes the synchronously detected signal and analyzes it to compare the signal with predetermined standard digital signals. The standard signals incorporate a number of discriminating features, for example the fluorescent light's wavelengths, amplitudes, and time delays relative to the modulated illuminating light. The standard signals may also incorporate spatial distributions such as bar codes as discriminating features. The discriminating features may be re-programmed by the user of the authentication system. Thus the discriminating features define a user-determined encryption of the articles' authentic identity. For applications in which the articles are stationary, the authentication system can include scanning means to scan the articles with modulated light. In other applications, the articles move past the authentication system optics and do not require scanning. In quality control applications, predetermined fluorescent substances are added in small percentages to tag other materials, which may be non-fluorescent, and the authentication system is used to provide statistical information about the presence and quantities of the tagged materials. The authentication system can include readers of visible bar codes, readers of magnetic stripe codes, or other readers of coded indicia, in addition to a reader of indicia made with fluorescent substances. Security documents having multiple fields, with at least one field bearing fluorescent indicia, make use of the authentication system and methods.

27 Claims, 6 Drawing Sheets

AUTHENTICATION SYSTEM AND METHOD

FIELD AND BACKGROUND OF THE INVENTION

This invention relates to detection of fluorescent radiation from articles including documents marked with materials that fluoresce when illuminated with non-visible radiation such as ultraviolet radiation. The invention is particularly applicable to detection of counterfeit documents or other counterfeit products and detection of documents or other products which have been subjected to tampering, forging, or other unauthorized modification. Thus the invention is particularly useful for confirming the authenticity and integrity of articles, including valuable documents such as legal papers, identification cards, credit cards, licenses, passports, customs and immigration documents, and valuable mail. The invention can also be applied to quality control of products, providing quantitative and statistical information where the presence or quantity of particular materials is important. Some other examples of applications include label verification, safety seal verification, article alignment, and sorting of articles into two or more categories.

Many methods have been known in the prior art to authenticate valuable articles. Some known methods include imprinting on the articles a white-light hologram or imprinting reflective and diffractive indicia displaying distinctive images that are difficult to counterfeit. Other known methods include incorporation of distinctive fibers into the articles, such fibers being detectable by visual observation, microwave irradiation, or other means. U.S. Pat. No. 4,92 1,280 describes fibers made luminescent by a dyeing process employing rare-earth compounds, which fibers may be incorporated into articles requiring authentication.

It is well-known in the prior art that documents may be authenticated by marking the documents with substances such as inks or dyes that appear invisible or relatively unnoticeable to the naked eye in ordinary visible illumination, but that fluoresce when illuminated with ultraviolet light, revealing marks that serve to identify the legitimate document. These methods depend on substances that are not easily or inexpensively identified by a counterfeiter, and not easily or inexpensively duplicated or mimicked by a counterfeiter. When using these methods, it is desirable to use substances such as dyes or inks that fluoresce in narrow spectral bands which are distinguishable by sufficiently narrow-band detectors, but not readily distinguishable by eye. In U.S. Pat. No. 4,146,792 by Stenzel et al., these methods are extended to include dyes containing rare-earth elements whose fluorescence is influenced by the chemical environment of the fluorescing atoms in a non-fluorescing matrix, and the detection is refined to include detection of predetermined fine structure in the line spectrum of emitted light. In this method, the spectral free structure is built into the marking dyes by the formulation of the dyes, and the corresponding discrimination of fine spectral structure is fixed in the physical structure of the checking device by the sizes and positions of photocells cooperating with an optical dispersion element, particularly a narrow-bandwidth interference filter. Yet another class of authentication methods uses substances which fluoresce in the infrared portion of the electromagnetic spectrum when illuminated by light in the visible portion of the spectrum.

In U.S. Pat. No. 4,642,526 by Hopkins and assigned to the assignee of the present invention, a source of ultraviolet light is made self-modulating at a predetermined frequency. Detection of the secondary radiation, filtering of the detected signal, and demodulation of the filtered signal at the predetermined frequency allow the system of Hopkins' invention to detect the fluorescent marks despite interference from ambient light sources.

Marking products with indicia such as bar codes using fluorescent substances such as inks or dyes is also known in the prior art, both for the purposes described above and for providing identification on the products without detracting from the products' appearance as normally viewed in visible light. U.S. Pat. No. 4,983,817 describes methods and apparatus for reading bar codes printed with fluorescent substances, while compensating for variations in background reflectance over the area printed with the bar code.

In many of the known authentication methods using fluorescence, the fluorescent identifying substance may be incorporated into the article during the article's manufacture instead of marking the article afterwards. One example is incorporating fluorescent substances such as dyes into paper during its manufacture and then using such paper for valuable documents.

While the various known methods of authenticating articles are useful for many purposes, there is a need for an authentication system that is more readily adaptable by the user, that is reliable, and that provides fast authentication in the presence of optical and electrical noise and bright ambient lighting.

SUMMARY OF THE INVENTION

An object of this invention is an authentication system that can detect articles marked with fluorescent substances such as inks or dyes to determine whether or not the articles are authentic. A further object of the invention is an authentication system that is adaptable by a user to reprogram the discrimination criteria used by the authentication system. A further object is an authentication system that performs reliably in the presence of optical and electrical noise, and is easy to set up, calibrate and verify. Another object is an authentication system with relatively long lamp lifetime. Yet another object is an authentication system that can be manufactured at relatively low cost, and can be made small enough and light enough to be easily portable. A further object is an authentication system that can read bar codes printed with substances such as inks which fluoresce under ultraviolet illumination, and also read normal visible bar codes, at high speed such as 50,000 scans per minute or more without requiring elaborate schemes for background compensation. A further object of the invention is an authentication system that can acquire and report to its user information, particularly statistical information, about the quality of articles to which it is directed. Other objects are methods of authenticating articles, and methods of encrypting the identity of authentic articles.

The present invention is based on the use of multi-dimensional and user-programmable discrimination criteria to detect and authenticate indicia on articles. The discrimination criteria may be programmed at the time of manufacture of the articles or later and may be reprogrammed by the user at the point of use of the authentication system at any later time. The same authentication systems can be used by many users, with each user having the capability to program discrimination criteria with the complexity and reliability appropriate to that user's needs and appropriate to the value of the articles to be authenticated.

The various detection criteria used in various combinations by the authentication system of this invention include the wavelengths of fluorescent emission lines, the relative or absolute amplitudes of those emission lines, the time delays of emissions after pulsed illumination with nonvisible light, and the spatial distributions of fluorescent materials on the article to be authenticated. The spatial distributions may be bar codes, for example. Or they may be any spatial distributions of marks, such as arrays of dots, characters to be recognized by optical character recognition, images such as half-tone images, signatures, fingerprints, etc. The combinations of discrimination criteria are used as codes for identifying the authentic article. The indicia made on the articles may include "false" or intentionally misleading codes, i.e. codes that are not actually used as part of the identification criteria combination. For example, bar codes can be printed with fluorescent materials whose emission wavelengths are not tested by the authentication system. If the correct predetermined and programmed combination code is not detected, the authentication system produces a negative authentication result, which may be used to initiate further actions of the apparatus.

For some applications, the authentication system may optionally include mechanical apparatus to sort authenticated from non-authenticated articles, and may optionally include further apparatus, under some circumstances, to confiscate or destroy unauthenticated articles, e.g. counterfeit credit cards or the like. Alternatively, under some circumstances, the sorted unauthenticated articles may be visibly marked by optional marking means to prevent their continued unauthorized use.

DETAILED DESCRIPTION OFT HE PREFERRED EMBODIMENTS

The authentication system of this invention requires that articles be marked with one or more substances such as dyes or inks which emit light (i.e. fluoresce) in one spectral region, such as the visible region, when illuminated with light in another spectral region, such as the ultraviolet region. Many dye and ink substances which fluoresce are known. Those particular fluorescent substances to be used with the authentication system of this invention are predetermined, and samples of those predetermined substances are used in predetermined concentrations to calibrate and program the authentication system.

In applications where it is desired to determine if articles have been modified, the fluorescent substances may be erasable. Thus, for example, on a check having erasable fluorescent substances printed in the amount field or signature field, erasure in those fields to modify the check would reduce the amount of fluorescent substance, and that reduction could be detected by a sufficiently sensitive authentication system.

The authentication system of this invention has a "front-end" portion containing optical elements including a lamp which is a source of ultra-violet light for illuminating an article to be authenticated, a beam splitter, optional scanning means, one or more lenses or mirrors, one or more optical dispersion elements or filters, and one or more photodiodes. The front-end portion is electrically shielded from external electrical noise, where the shielding includes a conductive glass window over the photodiode or photodiodes, with electrical connection between the conductive window and the other shielding. This front-end portion works in cooperation with an electronic portion which provides an AC or pulsed energizing signal for the lamp, processes the electrical signal from the photodiode, provides for calibration of the electrical signal, provides discrimination of the information contained in the signal to authenticate the tested article, and provides various outputs to be described below. The purposes of these elements and the relationships among them will become clear by reference to the drawings in conjunction with the following more detailed description.

Figure 1:
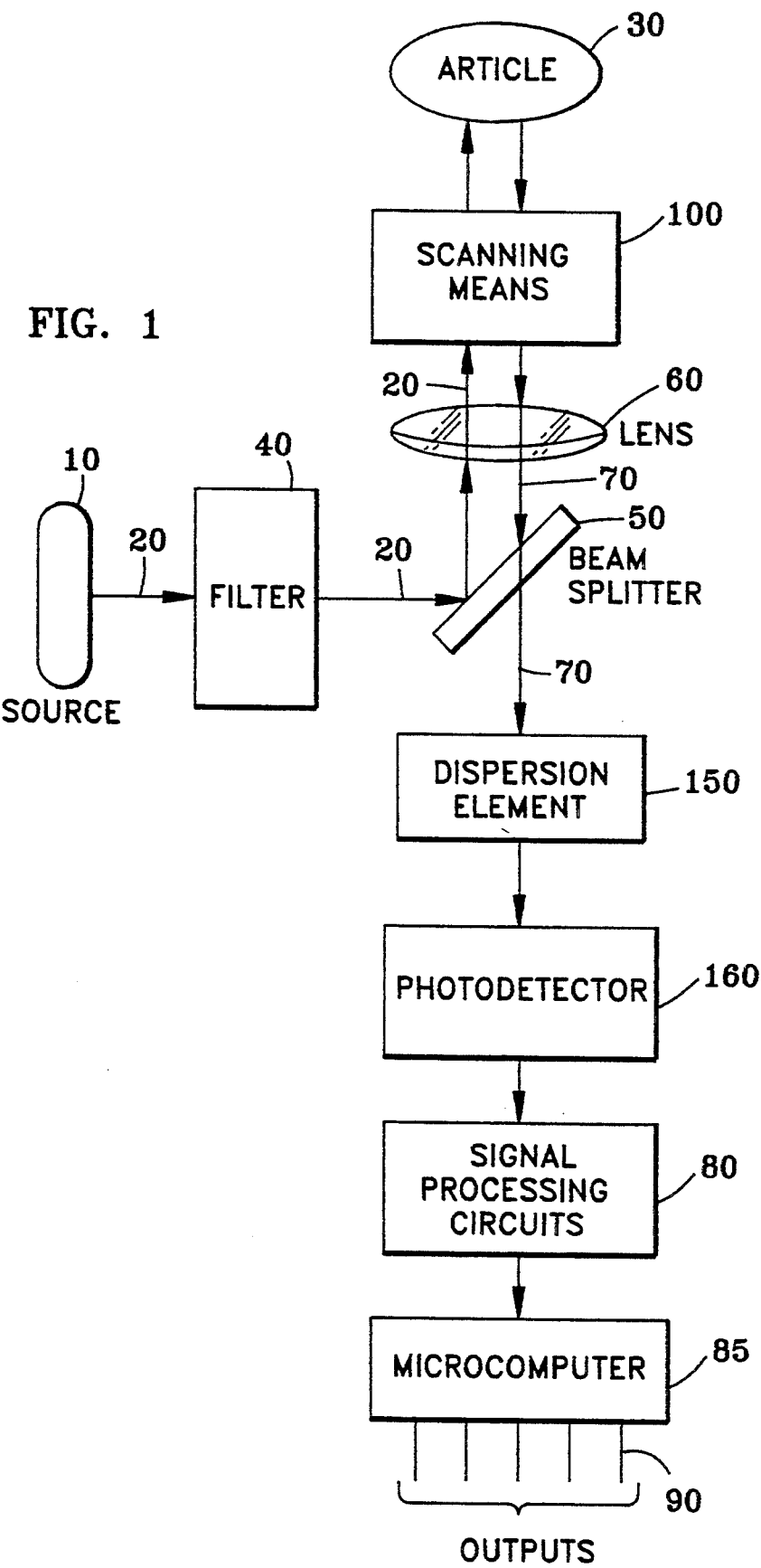
FIG. 1 illustrates a schematic diagram of an authentication system according to the present invention.

FIG. 1 is a schematic diagram showing the overall functional structure of the authentication system. An ultraviolet light source 10 provides ultraviolet light 20 to illuminate the article 30 to be recognized and authenticated. Article 30 is not part of the invention. If the source's light output contains significant amounts of visible light, an ultraviolet optical filter 40 may be used to block the visible light and to allow the ultraviolet light to pass. The ultraviolet light is directed by a beam splitter 50 toward the article, preferably through a lens 60, which focuses the ultraviolet light upon the article. The lens 60 must transmit both ultraviolet light and the fluorescent secondary light 70 returned from the article. A mirror may be used in place of lens 60. The fluorescent secondary light 70, which is often in the visible part of the optical spectrum, is directed by beam splitter 50 toward a dispersion element or filter set 150 to distinguish selected wavelengths allowed to reach photodetector 160. In a preferred embodiment, element 150 is a simple passband optical filter. The photodetector output is conditioned by electronic signal processing circuits 80, described in more detail below, to produce a signal suitable for analysis by a microcomputer 85. The microcomputer 85 analyzes the signal to produce various authentication result outputs 90, also described in detail below. For applications which require scanning, such as bar code reading, the authentication system also includes scanning means 100. The scanning means 100 may comprise one or more oscillating mirrors or other scanning means known in the art to provide repetitive deflection of an ultraviolet light beam. For some applications, such as the authentication of articles in a production line, the scanning means are not needed in the authentication system, as the articles may be passed before lens 60 automatically, for example by a conveyor belt.

For some applications, such as authentication of a credit card, it is desirable to have other inputs to the microcomputer, such as a magnetic stripe reader. The information encoded in the magnetic stripe is then used in combination with the fluorescent marking to add yet another dimension to the authentication process. Such combinations of more than one means of authentication can provide better overall security for articles of high value.

Figure 2:
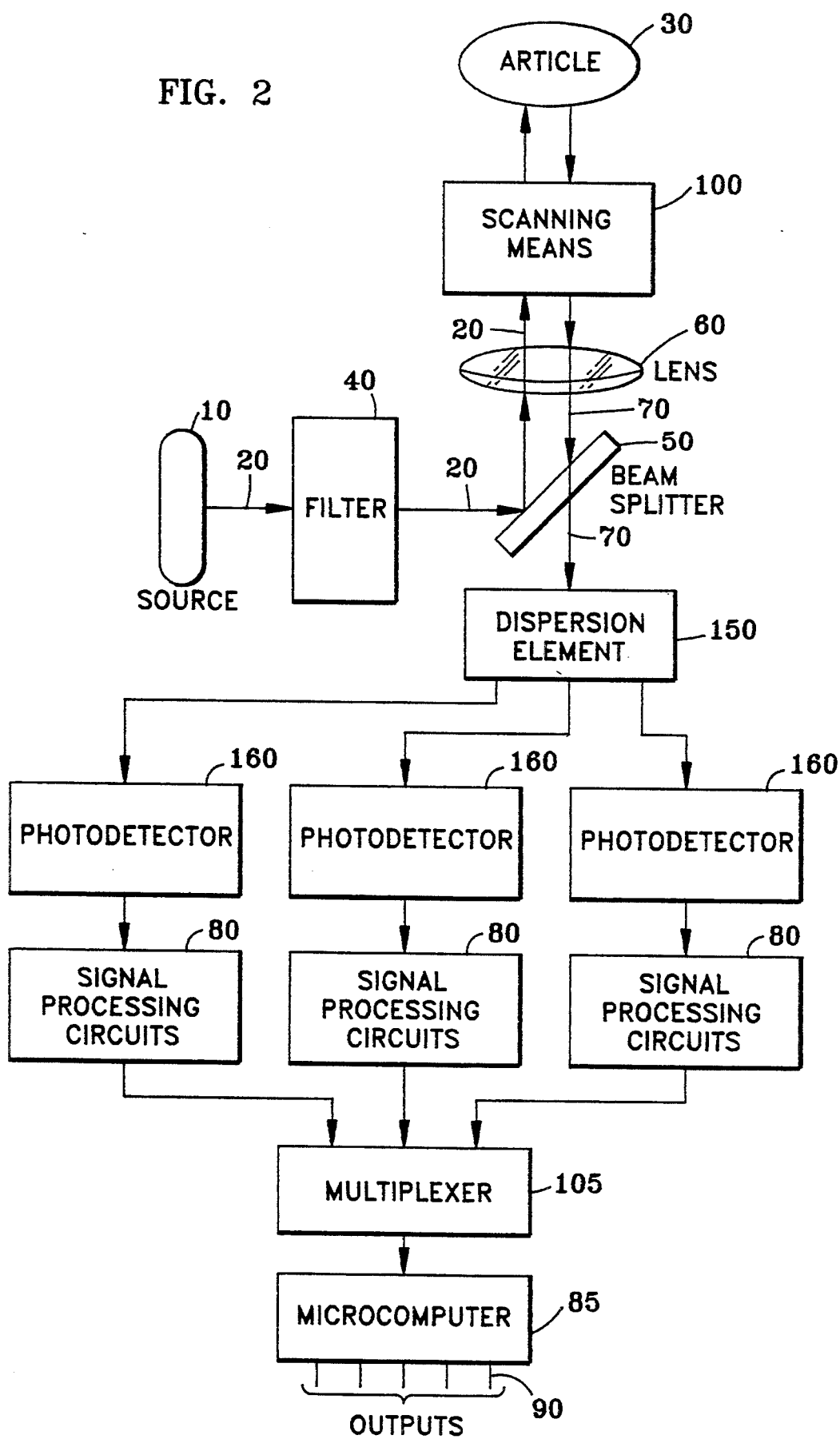
FIG. 2 shows a schematic diagram of another embodiment of the authentication system, having a multiplicity of parallel information channels.

In an authentication system for authenticating articles of high value, portions of FIG. 1 may be replicated to provide a number of additional parallel channels of information. For example, FIG. 2 illustrates a system with three information channels, where the respective analog outputs of the three channels are multiplexed by multiplexer 105. Each channel carries information about a narrow band of fluorescent light from the same articles For a system as shown in FIG. 2, the wavelength-selective element 150 is a set of bandpass filters or a dispersive element such as a prism or diffraction grating.

Figure 3:
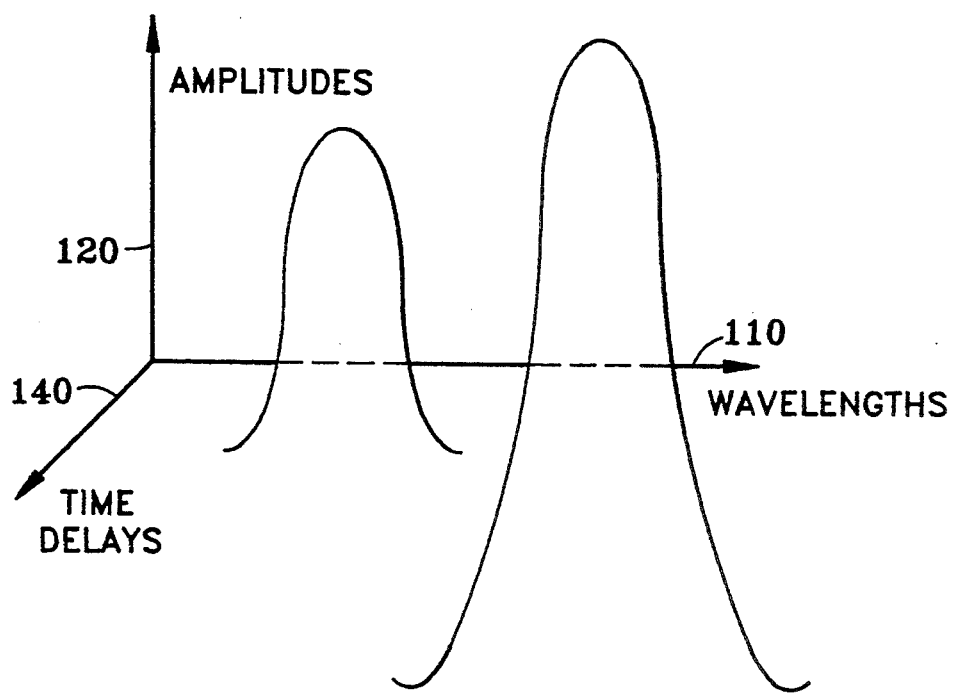
FIG. 3 illustrates a multi-dimensional discrimination space utilized in preferred embodiments of the invention.

An important feature of the authentication system is that it uses multiple dimensions of discriminating characteristics to authenticate the markings on articles. FIG. 3 shows an illustration of a three-dimensional discrimination space used in the logical operation of the authentication system. Because it is impractical to illustrate discrimination spaces of four or more dimensions by means of a drawing, FIG. 3 shows only a simplified scheme in which some of the discrimination dimensions have been omitted for clarity. The three dimensions shown in FIG. 3 are (a) the wavelengths 110 emitted by one or more fluorescent materials with which the articles have been marked, (b) the amplitudes of fluorescent response 120 expected from the marks, and (c) the time delay 140 of fluorescent emission expected from the marks. In experiments with apparatus as described here, wavelength differences of less than 50 nanometers and time delays of less than 20 nanoseconds were distinguished. The use of bar codes printed with fluorescent substances, for example, adds a spatial dimension to coding of article marking. The spatial dimension is not limited to bar codes, but may be implemented by using any predetermined pattern distinguished by the localized presence or absence of marks of one or more of the detectable wavelengths of fluorescent emission, or by a predetermined sequence of mark sizes. Such a sequence may be arranged along a particular spatial dimension or arranged in a pattern in more than one spatial dimension. Another manner of using spatial coding uses two or more bar codes printed in the same location on an article and detected by the authentication system as, for example, an invisible bar code printed over a visible bar code.

A predetermined combination of criteria to be used in authenticating articles may be considered an encryption of the articles' identity. Since that encryption is unknown to potential counterfeiters of the articles, and may be changed by the system user, the encryption provides a high degree of security against counterfeiting.

Figure 4:
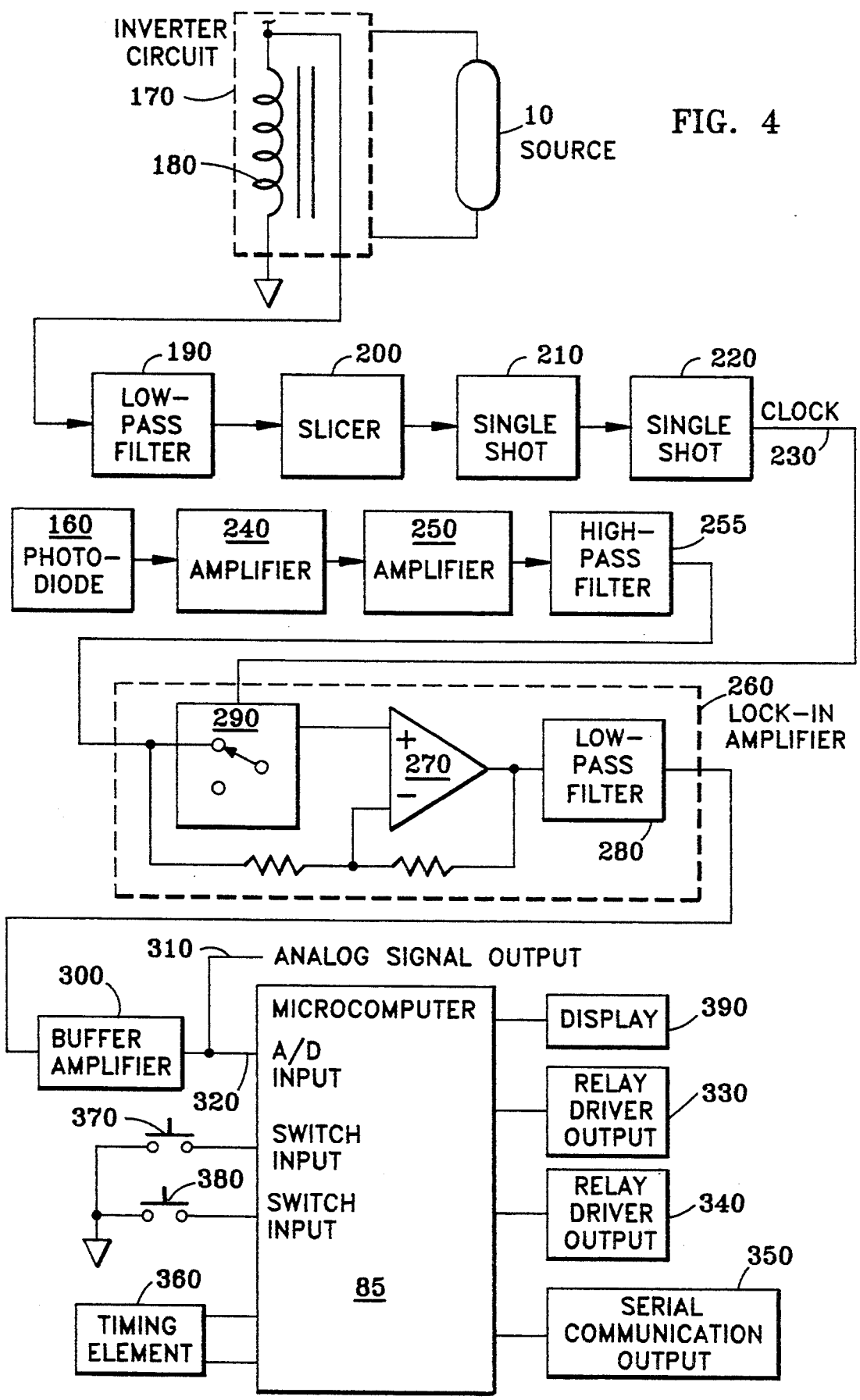
FIG. 4 shows a schematic diagram of a circuit used in the preferred embodiments to provide and interpret signals suitable for detection of predetermined article marking.

FIG. 4 shows a schematic diagram of a circuit used in the authentication system to perform the functions of energizing and modulating the ultraviolet lamp 10 at a high frequency, amplifying and synchronously demodulating the weak resulting fluorescent radiation signal from the photodiode 160, and producing an analog output. In one preferred embodiment, the ultraviolet lamp 10 is an ultraviolet cold-cathode fluorescent lamp. It will be understood that the light source 10 of the invention may be any suitable light source. For some applications of the authentication system for example, the preferred light source 10 is a pulsed laser, and suitable modifications are made to the circuit to energize the laser and control its pulse frequency.

A resonant push-pull inverter circuit 170 (acting as a lamp driver) converts 12 volt DC power to sinusoidal AC at a high frequency of more than about 25 kHz, preferably more than 50 kHz. The frequency is determined by the resonant frequency of an LC circuit made up of a transformer and capacitors in the inverter circuit 170 (not shown). Such inverter circuits are known in the art. In a preferred embodiment, it is desirable to limit the AC current supplied to the lamp 10. The high frequency output of inverter 170 is applied to the ultraviolet lamp 10 to energize it and to modulate its light output at twice the inverter frequency, i.e. more than about 50 kHz, preferably more than 100 kHz. A separate output is tapped from an inductor 180 of the inverter, and the pulses of current at the doubled frequency on this output are filtered and shaped to produce a clock signal for a lock-in amplifier. The inductor 180 may be part of a transformer of the inverter circuit. The current pulses are first filtered with a low-pass filter 190 to produce a substantially sinusoidal wave form, then shaped by slicer circuit 200, such as National Semiconductor voltage comparator circuit LM311, to produce a substantially square wave form. The square-wave signal is adjusted in phase by a first single-shot circuit 210, and adjusted to approximately 50% duty cycle by a second single-shot circuit 220 to produce the desired clock signal 230. In practical application of a preferred embodiment, single-shot circuits 210 and 220 are adjusted to optimize the sensitivity of the authentication system to the authentic articles or their equivalents used as calibration targets.

The fluorescent light returning from an article to be recognized is detected by a photodiode 160, such as a PIN type of photodiode. The photodiode signal is amplified by two low-noise, wide-bandwidth, high-gain amplifiers 240 and 250, such as Linear Technology LT1028 series ultra-low-noise operational amplifiers. In a preferred embodiment, the total gain of amplifiers 240 and 250 should be about 25,000 or higher. A high-pass filter 255 blocks low frequencies. The amplified and filtered optical signal is synchronously detected by the lock-in amplifier 260. The phase-adjustment single-shot 210 previously mentioned is used to adjust the look-in clock signal 230 with respect to the phase of the optical signal amplified from the photodiode. The look-in amplifier 260 comprises an amplifier 270 whose gain is switched between +1 and −1, followed by a low-pass filter 280. The switching of amplifier 270 gain is done by an field-effect transistor (FET) switch 290 driven by the clock signal 230. The low-pass filtered signal goes to a buffer amplifier 300, which produces the buffered analog signal output both to an output connector 3 10 and to an analog-to-digital (A/D) input 320 of microcomputer 85. The timing of microcomputer 85 operation is determined by a timing element 360, such as a ceramic resonator. Timing element 360 may alternatively be a suitable external clock input.

Microcomputer 85 may be, for example, a Motorola MC68HC705P9 or equivalent, or any one of a number of microcomputers classified as digital signal processors. In an alternate embodiment of the authentication system, the microcomputer 85 may be timed by a clock generator, and the frequency of lamp driver 170 may be derived from the microcomputer clock signal, as for example by frequency division.

The analog signal at input 320, produced by the circuit of FIG. 4, is converted within digital microcomputer 85 to a digital signal and used by the microcomputer according to its stored program to produce various digital outputs, including outputs to drive a display for displaying information to the operator of the authentication system and other outputs to control sorters or other optional apparatus. In a preferred embodiment, the microcomputer program compares the digital signal with standard digital signals previously stored in a memory portion of the microcomputer. In other embodiments, the microcomputer program and/or the standard digital signal information may be stored in external storage means, such as ROM's EPROM's, memory cards, IC cards, or the like, connected to microcomputer 85 by other connections not shown.

A number of authentication result outputs are provided by the authentication system for various purposes of users. The simplest output is the analog output of buffer amplifier 300 provided at analog output connector 310. The same signal is applied to A/D input 320 of the microcomputer 85, which processes the signal in a number of ways to produce other outputs. Some additional outputs provided from microcomputer 85 are relay driver outputs 330 and 340 at various voltages, a light-emitting dime (LED) array display 390, and an RS-232 standard serial communication output 350, which also serves as an input port to microcomputer 85. Microcomputer 85 has other inputs, including switch closure inputs 370 and 380 for use by the system operator. Microcomputer 85 may have still other inputs, such as digital inputs from a magnetic stripe reader used in conjunction with the fluorescent marking for further information to be used in determining authenticity of articles.

Figure 5:
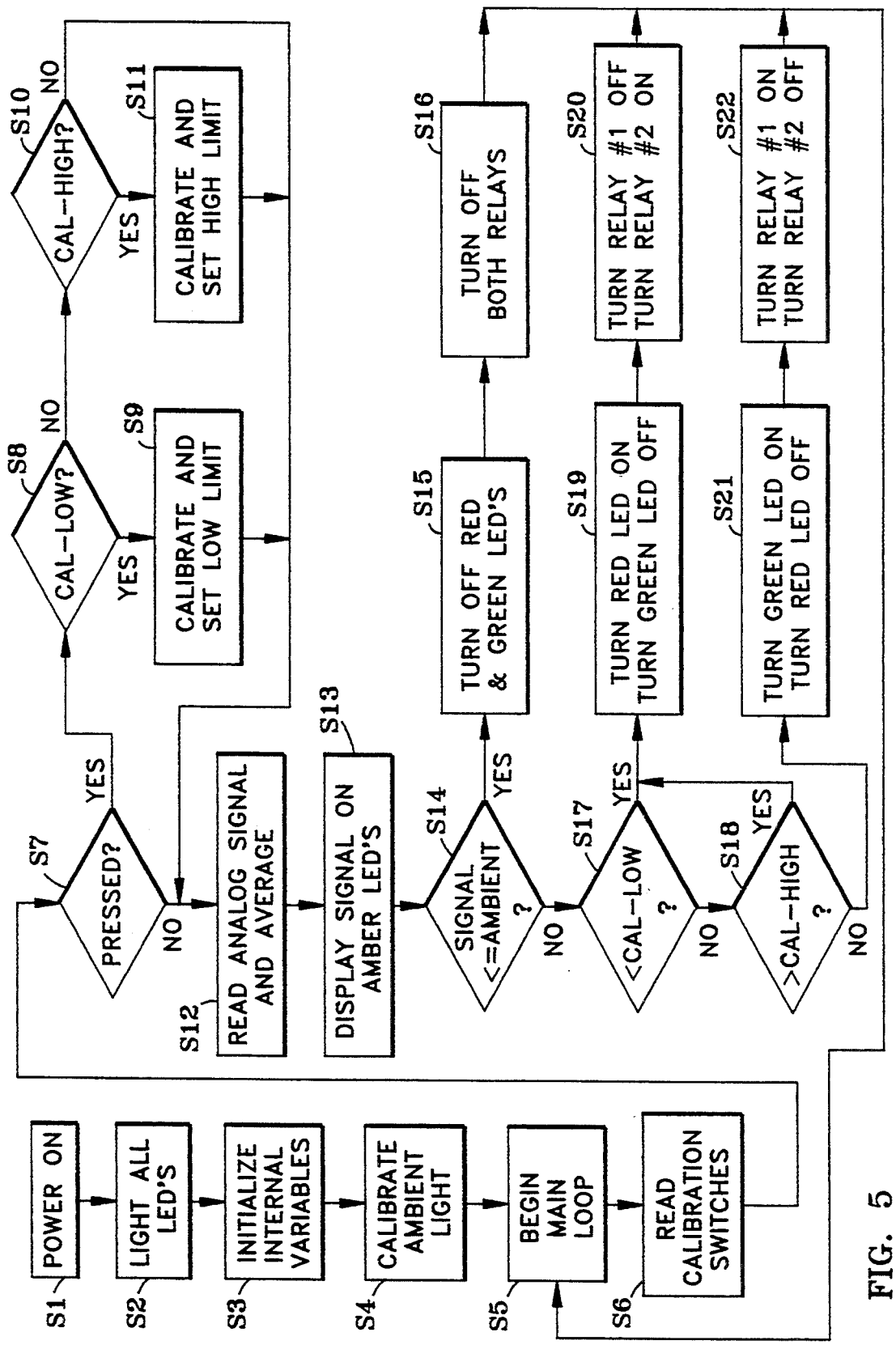
FIG. 5 shows a schematic flow diagram of a method used in a preferred embodiment to detect the predetermined article marking.

FIG. 5 is a flow chart illustrating a program used in a preferred embodiment of the invention. In FIG. 5, rectangular boxes represent actions and diamond-shaped boxes represent decisions. When the power is turned on (S1), the microcomputer program of the authentication system lights all LED indicators (S2), initializes all internal variables (S3), and calibrates the ambient fluorescent light (S4). The program then begins the main program loop (S5). It reads the calibration switches (S6). If one of them is pressed (S7), the program determines if it is the CAL-LOW switch (S8). If it is the CAL-LOW switch, the program calibrates and sets the low light limit (S9) and returns. If it is not, the program similarly determines if it is the CAL-HIGH switch (S10). If it is the CAL-HIGH switch, the program calibrates and sets the high light limit (S11) and returns. In an alterative embodiment not shown in FIG. 5, factory calibration results may be stored in a read-only-memory associated with the microcomputer, and the factory calibrations are then used in later steps of the program, unless the user over-rides the factory calibration. If no calibration switch is pressed, the program reads the analog signal a predetermined number of times and averages the results (S12). (In other embodiments not shown in FIG. 5, step (S12) may be triggered by external command, and the function of step S12 may include other treatments of the signal, other than averaging.) In the sequence shown in FIG. 5, the program displays the result in an array of amber LED's (S13). It compares the average result with the ambient light calibration (S14). If the result is less than or equal to the ambient, the program turns off both a red LED and a green LED (S15) and turns off both a first and a second relay (S16). The program then compares the average result with the low limit (S17), and compares the average result with the high limit (S18). If the result is less than the low limit or greater than the high limit, the program lights the red LED and turns off the green LED (S19), and also turns off a first relay and turns on a second relay (S20), and returns to restart the main loop (S5). If the result is not less than the low limit and not greater than the high limit, the program turns the green LED on and the red LED off (S21), and also turns on the first relay and turns off the second relay (S22), and returns to the main loop (S5). In this simple and inexpensive embodiment, the user can determine the authentication result by observing the LED's.

It will be understood that a similar program flow may be used for each of the several discrimination criteria or dimensions employed for discriminating articles by the methods and apparatus of the present authentication system.

Figure 6:
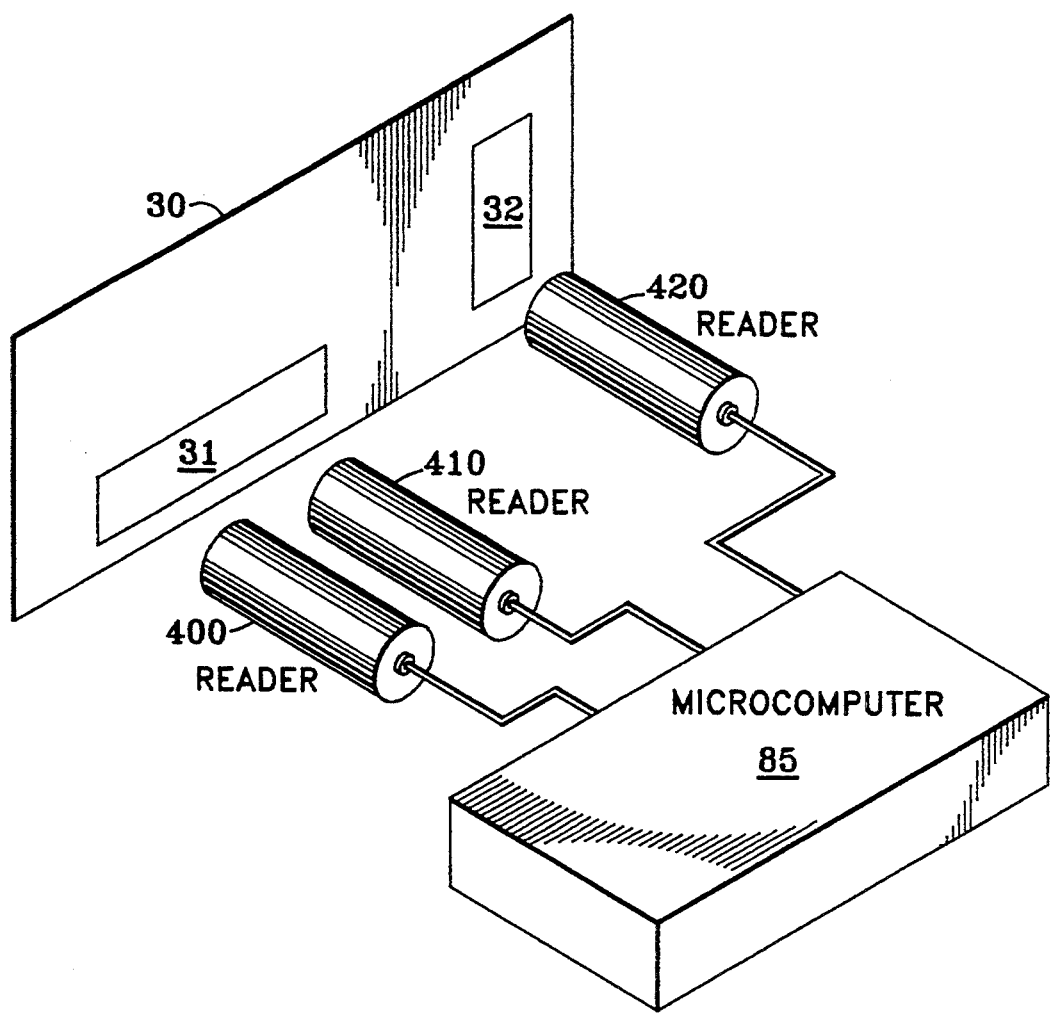
FIG. 6 shows a schematic diagram of an embodiment using a multiplicity of readers.

FIG. 6 illustrates another embodiment of the invention, which uses a multiplicity of readers to authenticate articles. Indicia of various kinds can be provided on articles known to be authentic. For example, a single article, such as a credit card, could carry ordinary visible bar codes, bar codes printed in fluorescent inks, and codes recorded in a magnetic stripe. In FIG. 6, article 30 has two kinds of indicia in a predefined field 31 and one kind of indicia in another predefined field 32. A reader 400 and a different reader 410 can both scan field 31 and read the two different kinds of indicia in that field, while a third reader 420 can scan field 32 and read the indicia in that field. For example, reader 400 may incorporate the apparatus described above for reading bar codes printed with fluorescent substances, and reader 410 can be a similar reader adapted for visible-ink bar codes, while reader 420 may be a magnetic stripe reader. The results of the three readers in this example are combined by microcomputer 85 to determine if the article is authentic. Optionally, a multiplexer (not shown) can be interposed between the multiplicity of readers and the microcomputer. It will be apparent that the number of different indicia may be two, or may be more than the three illustrated in FIG. 6. The security of the authentication scheme is enhanced by using multiple codes. The multiple codes can be combined in various ways unknown to a potential counterfeiter or unauthorized user of the article in question. For example one of the kinds of indicia may carry a key code which is used to allow access to information stored in a removable form of memory used with the authentication system. The access permission would operate similarly to the use of a password in allowing access to an information-processing system or to a particular account on such a system.

Security documents, such as bank checks, credit cards, driver's licenses, identification cards, legal documents such as wills and contracts may be made to take advantage of the methods of authentication described here. The methods using multiple discrimination criteria can be applied if the security document has two or more fields, at least one which bears indicia made with a fluorescent substance.

The authentication system is easy to use. The user directs the authentication system's optical front-end portion so that it illuminates the articles to be authenticated or moves such articles past the system's optical front end at a suitable speed and suitable distance, taking into account the focal length and depth of focus of the system's lens. The various authentication result outputs described above indicate whether or not an authentic article has been detected. If an authentication result output has been arranged to sort articles, then the articles are automatically sorted. If optional means to confiscate, destroy, or mark the unauthenticated articles have been included in the authentication system, those actions provided are carried out automatically unless additional means are included to require human confirmation of such actions.

Another way to use the authentication system is to incorporate the predetermined fluorescent substance such as dye or ink (at a predetermined concentration) into other material that is to be recognized and measured on articles during their manufacture, for quality control. The articles are passed before the authentication system to perform a quality control inspection. The authentication outputs are then recorded by the system microcomputer and analyzed statistically to provide statistical process control or quality control information about the articles. In particular, the microcomputer can be programmed to calculate statistical process control limits and to test each article for conformance to those process control limits. This kind of application of the authentication system is especially useful for monitoring expensive materials. In experiments on controlling a process of applying a non-fluorescent substance to a fluorescent paper, another fluorescent substance was added to the applied non-fluorescent substance at a level of only 0.02% and measured by the apparatus of this invention in the presence of the fluorescent background from the paper.

In a particularly simple manner of using the invention in one of its preferred embodiments, the operator first turns on the authentication system power, with no target article present within the view of the system. The system is programmed to read the ambient fluorescent light signal level automatically. The system may be calibrated by presenting sample targets known to produce low-limit and high-limit fluorescent light signals, while pressing the LOW and HIGH calibration limit switches respectively. Thereafter, the system automatically and repeatedly samples the fluorescent light from articles, indicating the result through an array of amber LED's, a red LED, a green LED, and two relays. The array of amber LED's is programmed to show the signal level on a linear or logarithmic scale. If the signal is in the range between the LOW and HIGH limits a green LED is turned ON, a red LED is turned OFF, and one relay is set to indicate a positive authentication. If the reading is between the ambient level and the LOW limit, or is above the HIGH limit, then a red LED is turned ON, the green LED is turned OFF, and another relay is set to indicate negative authentication. If the reading is at or below the ambient level, both LED's and both relays are set OFF, indicating that no authentication result is available.

It will be appreciated from the foregoing descriptions of the invention that many other combinations of discrimination criteria may be programmed into the authentication system described.

Having described our invention, we claim:

1. An authentication system for discriminating among articles marked with one or more fluorescent substances which emit fluorescent light in response to electromagnetic radiation, comprising:
   a) a source of electromagnetic radiation in at least one of the ultraviolet, visible, and infrared spectral ranges,
   b) means for modulating said electromagnetic radiation at a modulation frequency of more than about 50 kHz,
   c) means for synchronously detecting in at least one of said ultraviolet, visible, and infrared spectral ranges said fluorescent light at said modulation frequency to produce an analog signal,
   d) conversion means to convert said analog signal to a first digital signal,
   e) comparison means comparing said first digital signal with predetermined second digital signals with respect to a multiplicity of discrimination criteria, each to within a predetermined tolerance, and
   f) output means indicating a positive authentication result if said first and second digital signals agree to within each said predetermined tolerance, and otherwise indicating a negative authentication result.

2. An authentication system for discriminating among articles marked with one or more fluorescent substances which emit fluorescent light in response to electromagnetic radiation, comprising:
   a) a source of electromagnetic radiation in at least one of the ultraviolet, visible, and infrared spectral ranges,
   b) a driver circuit adapted to energize said source at a predetermined frequency, and to provide a first clock signal at a frequency selected from said predetermined frequency and a frequency equal to twice said predetermined frequency,
   c) a beam splitter disposed to direct said electromagnetic radiation toward said articles and to direct said fluorescent light emitted by said articles toward at least one detector capable of producing a first analog signal responsive to said fluorescent light,
   d) at least one optical element disposed to focus said electromagnetic radiation on said articles and to pass said fluorescent light from said articles,
   e) at least one wavelength-selective means disposed to allow selected portions of said spectral ranges to illuminate said detector,
   f) amplifier means disposed to synchronously detect said first analog signal at the frequency of said clock signal,
   g) low-pass filter means removing high frequencies from said detected first analog signal to produce a second analog signal
   h) an analog-to-digital converter converting said second analog signal to a digital signal,
   i) microcomputer means operating under a predetermined program and comparing said digital signal to one or more predetermined digital signals using a multiplicity of discrimination criteria adapted to discriminate between said marked articles and other articles not so marked, and
   j) digital output means indicating authentication or lack of authentication of said articles to be discriminated.

3. An authentication system as in claim 2 wherein
   a) said source of electromagnetic radiation comprises a cold cathode fluorescent lamp, b) said driver circuit comprises a DC to AC inverter having at least one inductive circuit element, and c) said first clock signal is derived from a tap on said inductive circuit element.

4. An authentication system as in claim 2 wherein said clock signal has a frequency of more than about 50 kHz.

5. An authentication system as in claim 2 wherein said first analog signal is derived from the output of a photodiode responsive to said fluorescent light, said photodiode output is filtered by a high-pass filter to produce a first filtered signal, and said first filtered signal is amplified by at least one amplifier having a total gain of more than about 25,000 to produce said first analog signal.

6. An authentication system as in claim 2 wherein said source of electromagnetic radiation comprises a laser, said driver circuit comprises a pulse generator whose output pulses drive said laser, said predetermined frequency is the frequency of said pulses, and the frequency of said first clock signal is the frequency of said pulses.

7. An authentication system as in claim 2 wherein said optical element comprises optical deflection means disposed to scan said electromagnetic radiation across at least a portion of each of said articles to be authenticated.

8. An authentication system as in claim 2 wherein said optical element comprises a lens.

9. An authentication system as in claim 2 wherein said optical element comprises a mirror.

10. An authentication system as in claim 7 wherein said deflection means comprises an oscillating mirror.

11. An authentication system as in claim 1 wherein said predetermined second digital signals comprise predetermined bar code signals.

12. An authentication system as in claim 2 wherein said predetermined digital signals comprise predetermined bar code signals.

13. An authentication system as in claim 2 wherein said predetermined program is stored in memory means removable from said authentication system.

14. An authentication system as in claim 2, further comprising sorting medians disposed to separate said articles to be discriminated into two or more sets of articles according to said digital output means.

15. An authentication system as in claim 14, further comprising marking means disposed to visibly mark articles discriminated as not authenticated, to prevent their further unauthorized use.

16. An authentication system as in claim 14, further comprising means to hold articles discriminated as not authenticated, to prevent their further unauthorized use.

17. A method for discriminating among articles marked with one or more predetermined fluorescent substances which emit fluorescent light in response to electromagnetic radiation, comprising the steps of a) preparing samples of said articles known to be authentic by marking with predetermined concentrations of said predetermined fluorescent substances, b) illuminating said known authentic articles with electromagnetic radiation in at least one of the ultraviolet, visible, and infrared spectral ranges, c) modulating said radiation with at least one predetermined modulation frequency and at least one first phase, d) selecting predetermined wavelength portions of said fluorescent light, e) synchronously detecting said predetermined wavelength portions of said fluorescent light at at least one said predetermined frequency and at a predetermined second phase and a predetermined duty cycle, to produce a first analog signal, f) filtering said first analog signal with a low-pass filter to produce a second analog signal, g) adjusting said predetermined second phase with respect to said first phase, h) adjusting said predetermined duty cycle, i) measuring the amplitude of said second analog signal, j) repeating steps (g), (h), and (i) until said second analog signal amplitude is maximized, k) repeating steps (b) through (f) for articles to be discriminated, l) converting said second analog signal to a digital signal, m) comparing said digital signal to at least one predetermined reference digital signal with respect to a multiplicity of discriminating criteria, n) activating predetermined outputs indicating authentication or lack of authentication of said articles to be discriminated according to the result of said comparing.

18. A method as in claim 17 wherein the step (m) of comparing said digital signal to at least one predetermined reference digital signal further comprises the substeps of a) comparing the amplitude of said digital signal at a first predetermined time to the amplitude of at least one first said predetermined reference digital signal, b) storing the result of said comparison in a first memory location, c) repeating substeps (a) and (b) a predetermined number of additional predetermined times and storing said results in additional memory locations, and d) comparing the contents of said first and said additional memory locations with a predetermined pattern.

19. A method as in claim 18 wherein said step (d) of comparing the contents of said memory locations further comprises the substeps of (a) averaging the contents of said memory locations to form an average value, and (b) comparing said average value with predetermined values.

20. A method as in claim 17 wherein said predetermined reference digital signal is a bar code signal.

21. A method as in claim 17 wherein said steps (b) and (c) are performed with a laser.

22. A method as in claim 17 wherein said predetermined modulation frequency is more than about 1 MHz.

23. An authentication system as in claim 2, further comprising a magnetic stripe reader having a digital output, wherein said magnetic stripe reader digital output is connected to said microcomputer to provide information used by said predetermined program to produce said digital outputs indicating authentication or lack of authentication.

24. An authentication system as in claim 2, wherein said multiplicity of discrimination criteria comprises two or more criteria selected from the list consisting of a) wavelengths of said fluorescent light, b) amplitudes of said fluorescent light, c) delay times of said fluorescent light, d) spatial distribution of said fluorescent light, e) spatial distribution of reflected electromagnetic radiation, and
f) information encoded magnetically in said articles.

25. A method for discriminating among articles marked with one or more predetermined fluorescent substances which emit fluorescent light in response to electromagnetic radiation, comprising the steps of
   a) preparing articles known to be authentic by marking said authentic articles with predetermined concentrations of said predetermined fluorescent substances having known emission wavelengths of said fluorescent light,
   b) characterizing the fluorescent responses of said articles known to be authentic with respect to a multiplicity of variables selected from the list consisting of
      i) wavelengths of said fluorescent light,
      ii) amplitudes of said fluorescent light,
      iii) delay times of said fluorescent light, and
      iv) spatial distribution of said fluorescent light,
   thereby producing a set of characterized responses;
   c) illuminating said articles with said electromagnetic radiation,
   d) selecting predetermined wavelength portions of said fluorescent light corresponding to said known emission wavelengths,
   e) comparing the characteristics of said predetermined wavelength portions with said set of characterized responses, and
   f) producing a positive authentication result if and only if said characteristics agree with said characterized responses.

26. A method of encrypting the identity of articles using one or more substances which emit fluorescent light when illuminated, comprising the steps of:
   a) preparing a set of discrimination criteria by
      i) selecting predetermined acceptance limits for the emission wavelength of at least one specific emission line of said fluorescent light as a first characteristic, and
      ii) selecting predetermined acceptance limits of at least one additional characteristic of said fluorescent radiation selected from the list consisting of amplitudes of said fluorescent light,
         delay times of said fluorescent light after illumination, and
         spatial distribution of said substances on said articles;
   b) marking said articles with said substances according to said selected characteristics to produce said discrimination criteria when illuminated; and
   c) optionally marking said articles according to other criteria of characteristics not so selected, thereby masking said selected discrimination criteria,
   whereby said articles bear encrypted identity marks.

27. A method of authenticating articles of unknown authenticity, comprising the steps of
   a) encrypting the identity of articles known to be authentic according to the method of claim 26,
   b) illuminating said articles of unknown authenticity with electromagnetic radiation suitable for exciting said fluorescent light,
   c) testing said fluorescent light characteristics with respect to said predetermined acceptance limits of said first characteristic and of said selected additional characteristics, and
   d) producing a positive output if and only if said predetermined acceptance limits are satisfied, thus authenticating only those articles known to be authentic.

* * * * *